US012448330B2

(12) United States Patent
Davydov et al.

(10) Patent No.: US 12,448,330 B2
(45) Date of Patent: Oct. 21, 2025

(54) COMPOSITION TREATED BY SILICONE AND ITS USE

(71) Applicant: WACKER CHEMIE AG, Munich (DE)

(72) Inventors: Dmitry Davydov, Moskwa (RU); Wei Cai, Burghausen (DE); Fanghua Lei, Shanghai (CN); Zheng Li, Shanghai (CN)

(73) Assignee: WACKER CHEMIE AG, Munich (DE)

( * ) Notice: Subject to any disclaimer, the term of this patent is extended or adjusted under 35 U.S.C. 154(b) by 728 days.

(21) Appl. No.: 17/784,832

(22) PCT Filed: Dec. 12, 2019

(86) PCT No.: PCT/RU2019/000936
§ 371 (c)(1),
(2) Date: Jun. 13, 2022

(87) PCT Pub. No.: WO2021/118392
PCT Pub. Date: Jun. 17, 2021

(65) Prior Publication Data
US 2023/0008861 A1 Jan. 12, 2023

(51) Int. Cl.
*C04B 24/42* (2006.01)
*C04B 7/52* (2006.01)
*C04B 14/28* (2006.01)
*C04B 28/02* (2006.01)

(52) U.S. Cl.
CPC .............. *C04B 24/42* (2013.01); *C04B 7/52* (2013.01); *C04B 14/28* (2013.01); *C04B 28/02* (2013.01)

(58) Field of Classification Search
CPC ........... C04B 24/42; C04B 7/52; C04B 14/28; C04B 28/02
See application file for complete search history.

(56) References Cited

U.S. PATENT DOCUMENTS 6,005,057 A * 12/1999 El-Jazairi ............... B02C 23/06
106/693

FOREIGN PATENT DOCUMENTS

| CN | 1332705 C | 8/2007 | |
| CN | 103191673 A | 7/2013 | |
| CN | 108239243 A | 7/2018 | |
| CN | 108424012 B | 1/2021 | |
| EP | 1144331 A1 | 10/2001 | |
| WO | 00139046 A1 | 7/2000 | |
| WO | WO-0039047 A1 * | 7/2000 | ............. B02C 23/06 |

OTHER PUBLICATIONS

S. Tsivilis et al., Thaumasite form of sulfate attack (TSA) in limestone cement pastes, Journal Of The European Ceramic Society, vol. 27, 2007), pp. 1711-1714, Elsevier Science Publishers, Barking, Essex, GB.
I. Z. Yildrim et al., Chemical, Mineralogical, and Morphological Properties of Steel Slag, Advances in Civil Engineering, vol. 2011, Jan. 1, 2011 (Jan. 1, 2011), pp. 1-13, Hindawi Publ. Corp., London, GB.
Cement "one hundred thousand" why, Lin Zongshou, p. 113, Wuhan University of Technology Press, published on Apr. 30, 2010.
Cooperative preparation and comprehensive utilization of solid waste, Zhan Jiayu et al., Zongshou, p. 113, China Building Materials Press, published on Apr. 30, 2010.
"Research on the Synthesis of Silicone-Modified Macromolecular Cement Grinding Aid", Liang Ying, Chemical Enterprise Management, Issue 3, p. 114, Jan. 31, 2017 (English translation summary included).

* cited by examiner

*Primary Examiner* — John E Uselding
(74) *Attorney, Agent, or Firm* — BROOKS KUSHMAN P.C.

(57) ABSTRACT

The present invention relates to the use of an additive which is an aqueous system of specific polyether silicones in clinker and cement preparation. The additive improves the grinding efficiency and also results in an improvement in the cured properties of cementitious compositions employing cement so produced.

11 Claims, No Drawings

COMPOSITION TREATED BY SILICONE AND ITS USE

CROSS REFERENCE TO RELATED APPLICATIONS

This application is the U.S. National Phase of PCT Appln. No. PCT/RU2019/000936 filed Dec. 12, 2019, the disclosure of which is incorporated in its entirety by reference herein.

BACKGROUND OF THE INVENTION

Field of the Invention

The present invention is directed to a new use of a silicone in grinding clinker and the resulting cement type products therefrom.

Background of the Invention

Cement is used to designate many different kinds of agents useful to bind materials together. The present invention is directed to hydraulic cements useful to form structural elements, such as roads, bridges, buildings and the like. Hydraulic cements are powder material which, when mixed with water, alone or with aggregate, form rock-hard products, such as cement paste, mortar or concrete. Cement Paste is formed by mixing water with a hydraulic cement. Mortar is formed by mixing a hydraulic cement with small aggregate (e.g. sand) and water. Concrete is formed by mixing a hydraulic cement with small aggregate, large aggregate (e.g. 0.5-2.5 cm stone) and water. For example, Portland cement is a commonly used hydraulic cement material.

Generally, hydraulic cements are prepared by sintering a mixture of components including calcium carbonate (as limestone), aluminum silicates (as clay or shale), silicon dioxide (as sand), and minor amount of iron oxides. The components lose their separate identity and are chemically transformed during the sintering process. During the sintering process, chemical reactions take place wherein hardened nodules, commonly called clinkers, are formed.

After the clinker has cooled, it then goes to the ball mill together with a small amount of gypsum (calcium sulfate) (about 5-20 wt %) in a cement grinding mill to provide a fine, homogeneous powdery product. In certain instances, other materials may be ground with the clinker or blended with the clinker to provide a particular type of hydraulic cement. A frequently added component is limestones, granulated blast furnace slag, pozzolans or fly ash which are substituted for a portion of the expensive clinker material.

The limestone and the clinker may be ground together, or ground separately and then blended together.

Slag, and fly ash are generally less active in comparison to the clinker. The limestone component is a completely inert filler and do not possess any of binding activity by itself. These components are used in cements where economy is of prime consideration and some diminution in strength is acceptable.

The term "Blended Cement" refers to hydraulic cements having between 5 and 80 wt % (more conventionally 5-60 wt %) slag, fly ash, limestone or the combination thereof, as part of its composition.

Hydraulic cements products include Portland cement, blast furnace slag cement, slag modified Portland cement, composite cement and the like.

Due to the hardness of the clinker, a large amount of energy is required to properly mill it into a suitable powder form. Energy requirements for finish grinding can vary depending upon the nature of the clinker or the mineral mixture.

Several materials such as glycols, alkanolamines, aromatic acetates, etc., have been shown to reduce the amount of energy required and thereby improve the efficiency of the grinding of clinkers or mineral mixtures to obtain cement. These materials, commonly known as grinding aids, are processing additives which are introduced into the mill in small dosages and interground with the clinker or mineral mixture, to attain a uniform powdery mixture.

One of the major classes of grinding aids used today is that of oligomers of lower alkylene glycols, such as diethylene glycol in form of aqueous system with 30-40 wt % solid content. They are used because of their availability and low cost.

CN108424012A discloses a liquid grinding aid capable of improving steel slag grinding efficiency. Such a grinding aid is a mixture which contains a grinding aid dispersant (silicone surfactant), a solubilizer, inorganic salt, polyethylene glycol and water. The silicone surfactant is a polyoxyethylene modified trisiloxane, polyether modified silicone, polyether-modified heptamethyltrisiloxane or polyether phosphate modified silicone.

CN108239243A discloses a process of preparing organic silicone modified with polyether side chains and the use of this silicone as a grinding aid in cement product preparation.

CN1332705A or EP1144331A1 disclose a grinding aid for slag and slag/clinker blends. Such grinding aids contain trimethyl endblocked polydiorganosiloxanes or alkoxysilanes or hydroxyl terminated polydiorganosiloxanes. The grinding aid could be used in an amount from 10 grams to 20,000 grams per metric ton of slag.

SUMMARY OF THE INVENTION

The silicone of the present invention improves grinding efficiency of clinker or mineral mixtures thereof during finish grinding, thus reducing the amount of energy consumed during the finish grinding process. In addition, concrete or mortar made from the cement thereby obtained containing the grinding aid, shows better short- and long-term compression strength over concrete or mortar made having no such grinding aid.

DETAILED DESCRIPTION OF THE PREFERRED EMBODIMENTS

The technical protocols to achieve the invention goals can be concluded as below:

A composition comprising: a cement treated with a silicone-containing grinding aid; wherein the amount of limestone in the cement is greater than or equal to 3 wt %, preferably between 3-45 wt %, more preferably between 5-30 wt %, yet more preferably between 8-25 wt %, and most preferably between 12-20 wt %, based on 100 wt % of the cement, said silicone-containing grinding aid comprising a silicone of formula 1 which is a polyether modified polysiloxane,

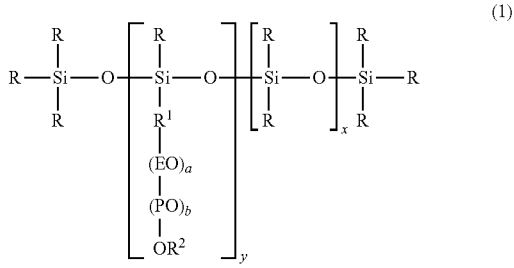 (1)

wherein each R is same or different and represents C1-C40 monovalent hydrocarbon groups, C1-C40 monovalent hydrocarbon groups having hetero atoms, preferably methyl, ethyl, OH, aminoethyl aminopropyl, more preferably methyl, ethyl, $R^1$ represents divalent hydrocarbon groups having 1-40 carbon atom, preferably methylene, ethylene, propylene, more preferably propylene, $R^2$ represents $CH_2CH_3$, $COH(CH_3)_2$, $COCH_3$, $CH_3$ or H, EO represents $CH_2CH_2O$, PO represents $CH_2(CH_3)CH_2O$, a is an integer selected from 0-12, preferably selected from 6-8, b is an integer selected from 0-3, a+b≥1; x is an integer between 0-3, y is an integer between 1-3, x+y≥1.

A composition comprising: a mineral mixture treated with the silicone containing grinding aid mentioned above; wherein the limestone in the mineral mixture is greater than or equal to 5 wt %, preferably between 5 to 30 wt %, and most preferably between 8 to 20 wt %, more prefer between 12 to 20 wt %, based on 100 wt % of the mineral mixture.

In the present invention, the mineral mixture is a mixture containing sintered clinker, optionally gypsum, optional ground limestone, optionally slag, optionally pozzolans and optionally fly ash. The mineral mixture is the mixture before the grinding step in the ball mill. The diameter of mineral mixture particles is usually between 3-50 mm, preferably between 3-10 mm. In the mineral mixtures, the clinker constitutes up to 70 wt % of the mineral mixture, preferably more than 80 wt %, more preferably more than 90 wt %, based on 100 wt % of the mineral mixture.

After the grinding step in the ball mill, the mineral mixture is now cement. The weight of mineral mixture remains almost the same as that of the cement, but the binding activity is greatly changed.

In the present invention, ball mill or finish mill or cement grinding mill means the last grinding step for the mineral mixture.

According to the composition mentioned above, the clinker was made by sintering a mixture that contains 0-90% of limestone, 0-90% of silica sand, and 0-90% of clay or shale.

According to the composition mentioned above, the content of the cement treated with the above-mentioned silicone-containing grinding aid is greater than or equal to 50 wt %, preferably larger than or equal to 70 wt %, more preferably greater than or equal to 85 wt %, yet more preferably greater than or equal to 95 wt %, and most preferably larger than or equal to 99 wt %, based on the total weight, of the composition.

According to the composition mentioned above, the water content is less than 1 wt %, preferably less than 0.5 wt %, more preferably less than 0.1 wt %, based on the total weight of the composition.

According to the composition mentioned above, the silicone in formula 1 is present in 15-1000 ppm, preferably 15-500 ppm, more preferably 50-300 ppm, based on the total weight, as 100 wt %, of the composition.

According to the composition mentioned above, the silicone containing grinding aid is an aqueous system.

According to the composition mentioned above, the dosage of silicone of formula 1 is 0.1-50 wt %, preferably 1-20 wt %, more preferably 1-10 wt %, based on the total weight of the silicone-containing grinding aid.

According to the composition mentioned above, the dosage of oil is less than 1 wt %, preferably less than 0.5 wt %, more preferably less than 0.1 wt %, based on the total weight of the silicone-containing grinding aid.

In present invention, an oil is any nonpolar chemical substance that is a viscous liquid at room temperatures (23±2° C.) and is both hydrophobic and lipophilic; selected from polydimethylsiloxane, mineral oil or vegetable oil.

According to the composition mentioned above, the silicone-containing grinding aid comprises a mixture of silicone of formula 1 and a second substance, wherein the second substance is one or more substances selected from the group of mono-, di-, or tri-substituted ethanolamines; mono-, di-, or tri-substituted oxyethanolamines; mono-, di-, or tri-substituted propanolamines; mono-, di-, or tri-substituted isopropanolamines; polyhydric alcohols, including glycerin; polyoxyethelene glycols of different molecular weight; and polypropylene glycols of different molecular weight.

According to the composition mentioned above, the dosage of the second substance is less than 5 wt %, preferably less than 1 wt %, more preferably less than 0.5 wt %, based on the total weight of the silicone-containing grinding aid.

The composition mentioned above may further comprise untreated clinker in an amount of 0.1-90 wt % by weight of the composition; preferably in an amount of 1-50 wt %, more preferably in an amount of 1-30 wt %, preferably in an amount of 1-10 wt %, based on the total weight of the composition.

The composition mentioned above may further comprise untreated mineral mixture in an amount of 0.1-90 wt % by weight of the composition; preferably in an amount of 1-50 wt %, more preferably in an amount of 1-30 wt %, and most preferably in an amount of 1-10 wt %, based on the total weight of the composition.

The composition mentioned above may further comprise untreated cement in an amount of 0.1-90 wt % by weight of the composition; preferably in an amount of 1-50 wt %, more preferably in an amount of 1-30 wt %, and most preferably in an amount of 1-10 wt %, based on the total weight of the composition.

In the present invention, "untreated" clinker, mineral mixture or cement, means that is neither treated by the silicone in formula (1) nor by other organic grinding aids.

In the present invention, "treated" clinker, mineral mixture, or cement means that it has been treated by the silicone in formula 1 or the silicone containing grinding aid, preferably before, during or after the grinding process in the ball mill, more preferably during the grinding process in the ball mill.

According to the composition mentioned above, untreated cement is mixed with treated cement after the grinding process in a ball mill.

According to the method mentioned above, the untreated cement has been ground by a ball mill.

According to the composition mentioned above, the compressive strength of the composition is improved.

A silicone containing grinding aid, being an aqueous system containing
- 50-99.9 wt % water, preferably 80-99.5 wt %, more preferably 85-99 wt %,
- 0.1-50 wt % silicone of formula 1, preferably 0.5-20 wt %, more preferably 1-15 wt %, and
- 0-10 wt % of a second substance,
- wherein the aqueous system contains self-assembled structures which are selected from particles, spheres, layers or liquid crystal structures, more preferably spheres or layers.

According to the silicone-containing grinding aid mentioned above, the aqueous system comprises micelles. The aqueous system is not an emulsion.

In present invention, a micelle is an aggregate of surfactant molecules dispersed in a liquid colloid. A typical micelle in aqueous solution forms an aggregate with the hydrophilic "head" regions in contact with surrounding solvent, sequestering the hydrophobic tail regions in the micelle center. The silicone of formula 1 acts like a surfactant molecule in the present invention.

The invention is also directed to a method for improving the efficiency of clinker or cement grinding, comprising the steps of: treating a clinker or mineral mixture by the above mentioned silicone of formula 1 or silicone containing grinding aid in the ball mill, wherein the amount of limestone in the clinker or the mineral mixture is greater than or equal to 3 wt %, preferably between 3-45 wt %, more preferably between 5-30 wt %, yet more preferably between 8-25 wt %, and most preferably between 12-20 wt %, based on 100 wt % of the clinker or cement.

According to the method mentioned above, the silicone of formula 1 is present in an amount of from 15-1000 ppm, preferably 15-500 ppm, more preferably 50-300 ppm, based on the total weight of cement.

According to the method mentioned above, the grinding efficiency is increased. Preferably the temperature in the ball mill is decreased.

A cement is made from the treated clinker or treated mineral mixture mentioned above.

A cement is made with the composition mentioned above.

According to the cement mentioned above, the compressive strength of the cement is improved.

The invention is also directed to use the silicone of formula 1 as a grinding aid in cement manufacture, wherein the compressive strength of the cement is improved, wherein the limestone in the cement is greater than or equal to 3 wt %, preferably between 3-45 wt %, more preferably between 5-30 wt %, yet more preferably between 8-25 wt %, more preferably between 12-20 wt %, based on 100 wt % of the cement.

According to the use mentioned above, wherein increases the grinding efficiency is increased, preferably decreasing the temperature in the ball mill.

The invention is also directed to use of the silicone of formula 1 as a post additive in cement paste, mortar or concrete preparation, wherein improve the compressive strength of the cement paste, mortar or concrete is improved, wherein said cement paste, mortar or concrete all contain cement, and limestone in the cement is greater than or equal to 3 wt %, preferably between 3-45 wt %, more preferably between 5-30 wt %, yet more preferably between 8-25 wt %, and most preferably between 12-20 wt %, based on 100 wt % of the cement.

The invention is further directed to the use of the silicone-containing grinding aid as a post additive in cement paste, mortar or concrete preparation, wherein the compressive strength of the cement paste, mortar or concrete is improved, wherein said cement paste, mortar or concrete all containing cement, and limestone in the cement is greater than or equal to 3 wt %, preferably between 3-45 wt %, more preferably between 5-30 wt %, yet more preferably between 8-25 wt %, and most preferably between 12-20 wt %, based on 100 wt % of the cement.

According to the use mentioned above, the silicone in formula 1 is preferably present in an amount from 15-1000 ppm, more preferably 15-500 ppm, and most preferably 50-300 ppm, based on the total weight, as 100 wt %, of cement.

In the present invention, "post additive" means adding silicone of formula 1 or silicone-containing grinding aid before or after or during the process of mixing with water, preferably during the process of mixing cement, optional small aggregate, optional large aggregate, optional grand limestone with water, during the manufacture process of cement paste, mortar or concrete.

According to the use mentioned above, the compressive strength of the cement paste, mortar or concrete is improved.

All percentages, ratios, parts and proportions are by weight unless otherwise specified.

Silicone 1, trisiloxane modified by polyethoxylates, of formula 1 mentioned above, 100 wt % purity, provided by WACKER Chemie AG, The specific surface area of milled clinker (or milled mineral mixture) made of such, designated as the Blaine in $m^2/Kg$, was measured using EN 196-6. The average value of 3 different samples was taken and values with more than 5% variation from the average were discarded, following standards defined by EN 196-6 and also accepted by cement producers. Blaine is correlated directly with the strength of the resulting cement.

Example 1

The laboratory tests for strength of Mortar

Admixture 1 that is, a silicone-containing grinding aid, is an aqueous system prepared by mixing Silicone 1 with water, wherein the content of Silicone 1 is 1 wt %, based on the total weight of the Admixture 1.

Admixture 1 contains self-assembled structures formed by molecules of Silicone 1 after Silicone 1 is added to water.

The procedure of the mortar preparation was the following:

Add Admixture 1 and water to the mixer, add the cement in amount of 450 g during the mixing at 140 rpm. Mix for 30 seconds, then add sand (accordance to ISO EN 196-1) in amount of 1350 g, during the rotation of the mixer at 285 rpm. After addition of sand, keep mixing at 285 rpm within 60 sec. Then let stand with no mixing for 90 sec, and then mix for 60 sec at a speed of 140 rpm. After the mortar was prepared, it was compacted to the steel cast to obtain prisms of 40×40×160 mm.

Keep the mortar in the mould at 90% relative humidity (RH) and temperature of (20±2)° C. for 24 hrs. After that demould the samples and put them for 7 days in water at (20±2)° C. After 7 days return to the chamber with RH 90% and (20±3)° C., and keep there for 21 days more.

After 28 days make a measurement of compressive and flexural strength.

The obtained results demonstrated for several cement types represented in Table 1-2.

TABLE 1-1

Examples and comparison examples of mortar

| Mortar | Silicone 1 content in cement (ppm) | sand Amount (g) | Cement Amount (g) | Type in acc. EN 197-1 | limestone content in cement (wt %) |
|---|---|---|---|---|---|
| C. Ex. 1 | 0 | 1350 | 450 | CEM II B-M containing slag | 0 |
| Ex. 1 | 250 | 1350 | 450 | CEM II B-M containing slag | 0 |
| C. Ex. 2 | 0 | 1350 | 450 | CEM II A-M containing slag | 0 |
| Ex. 2 | 250 | 1350 | 450 | CEM II A-M containing slag | 0 |
| C. Ex. 3 | 0 | 1350 | 450 | CEM II A-M containing slag and limestone | 10 |
| Ex. 3 | 250 | 1350 | 450 | CEM II A-M containing slag and limestone | 10 |
| C. Ex. 4 | 0 | 1350 | 450 | CEM II A-L containing limestone | 18 |
| Ex. 4 | 250 | 1350 | 450 | CEM II A-L containing limestone | 18 |

"content in cement" of Silicone 1 or limestone is based on the total weight of cement.

TABLE 1-2

The strength of mortar

| Mortar | Flexural Strength 28 d, MPa | Compressive Strength 28 d, MPa | Difference vs C. Ex. |
|---|---|---|---|
| C. Ex. 1 | 5.7 | 35.4 | 0.00 |
| Ex. 1 | 5.7 | 30.9 | −14.49 |
| C. Ex. 2 | 4.8 | 35.6 | 0.00 |
| Ex. 2 | 4.8 | 36.4 | 2.13 |
| C. Ex. 3 | 5.8 | 34.1 | 0.00 |
| Ex. 3 | 6.4 | 37.5 | 9.13 |
| C. Ex. 4 | 6.1 | 44.9 | 0.00 |
| Ex. 4 | 7.4 | 54.9 | 18.21 |

Flexural Strength and Compressive Strength in present invention are tested according to EN 196-1

The results show that the addition of Admixture 1 increases the compressive strength on +5-20% in comparison to the blank mortar mixture. The effect is higher for high limestone containing cement and not effective for cements containing no limestone.

Example 2. The Laboratory Ball Mill Tests

The ball mill had an inner volume of 100 L. It was loaded for 40 vol % with milling bodies. The fractions of the bodies (measured in diameter) were the following:
20 mm-25%, 30 mm-35%, 40 mm-15%, 50 mm-15%, 70 mm-10%.

The amount of the Mineral Mixture 2 was the following: 95 wt % of clinker, 5 wt % of gypsum, with a total weight of 5265 g.

Admixture 2 a silicone-containing grinding aid, is prepared by mixing Silicone 1 with water, wherein the content of Silicone 1 is 10 wt %, based on the total weight of the Admixture 2.

The dosage of Silicone 1 in the Mineral Mixture 2 is roughly 200 ppm, based on the total weight, as 100 wt %, of the Mineral Mixture 2.

The diameter of the Mineral Mixture 2 before milling was in the range of 3-10 mm. The milling time was fixed for 40 min. The speed was 50% of maximal. After the grinding process, the Cement 1 or Cement 2 is prepared.

Mortar 2-1 and Mortar 2-2 is prepared according to that in Example 1, and in accordance to EN 196-1.

TABLE 2-1

| | Admixture | Admixture 2 Mixture of lignin, amines and polyalcohols, | Mineral Mixture 2 Clinker (g) | Gypsum (g) |
|---|---|---|---|---|
| Cement 1 | 200 ppm* | | 5001.75 | 263.25 |
| Cement 2 | | 200 ppm | 5001.75 | 263.25 |

The dosage of Silicone 1 in Mineral Mixture 2 is roughly 200 ppm, based on the total weight, as 100 wt %, of Mineral Mixture 2.

TABLE 2-2

| | 24 hrs, 80° C., RH 90% | | 48 hrs, (20 ± 2)° C., water | | 28 days | | Setting time (min) | | Blaine, cm²/g |
|---|---|---|---|---|---|---|---|---|---|
| | FS* | CS* | FS | CS | FS | CS | Initial | Final | |
| Mortar 2-1 | 4.8 | 42.7 | 4.4 | 22.4 | 8.1 | 51.1 | 155 | 182 | 4028 |
| Mortar 2-2 | 5.1 | 40.9 | 4.8 | 22.7 | 7.9 | 52.2 | 129 | 159 | 4065 |

*FS-Flexural strength, CS-Compressive strength.

In Table 2-2, the effect of Admixture 2 is seen at temperature-vapor treatment: compressive strength for samples of Mortar 2-1 after 24 hours exposure in chamber with relative humidity 90% and temperature 80° C. is 4% higher, than that for samples, treated with conventional admixture.

One of the very essential parameters for mortar and concrete producers is initial and final setting time. The initial setting time for Mortar 2-1 is 26 minutes higher, then that for Mortar 2-2. The final setting time is also 23 minutes higher for Mortar 2-1.

It demonstrates that the use of Admixture 2 during the grinding process of clinker-gypsum mineral mixture leads to prolong of both initial and final setting times on 20-15% in comparison to conventional admixture, further with the retention of compressive strength. This technical effect distinguishes the Admixture 2 from conventional grinding aid, and conventional retarders. The use of conventional acid-based retarders typically decreases the compressive strength for mortars and concrete.

Example 3. Industrial Test Results

The test was made within 1 shift in the line of a cement production factory. A horizontal ball mill with steel balls was used.

The figures in Table 3-2 indicate the higher efficiency by adding the Admixture 2. After the grinding in the ball mill, the cement in type CEM II A-L 42.5 N (EN 197-1) is obtained.

TABLE 3-1

The materials in 2 Trials

| | Admixture | | Mineral Mixture 3 | | |
|---|---|---|---|---|---|
| | Admixture 2 | water | Clinker (wt %) | Gypsum (wt %) | Limestone (wt %) |
| Trial 1 | 200 ppm* | | 80 | 5 | 15 |
| Trial 2 | | 200 ppm* | 80 | 5 | 15 |

*The dosage of Silicone 1 is roughly 200 ppm, based on the total weight, as 100 wt %, of the cement.

TABLE 3-2

The results of 2 Trials

| | production rate* tons per hour | Temperature ° C. |
|---|---|---|
| Trial 1 | 111-118% | 93-95% |
| Trial 2 | 100% | 100% |

*the production rate measured from equipment signals on the production control panel of the whole production line.

The invention claimed is:

1. A limestone-containing composition, comprising:
cement produced by grinding a mineral mixture and/or clinker treated with a silicone-containing grinding aid; wherein the limestone in the cement is present in an amount greater than or equal to 3 wt %, based on the total weight of the cement,
the silicone-containing grinding aid comprising a silicone of formula 1, which is a polyether modified polysiloxane,

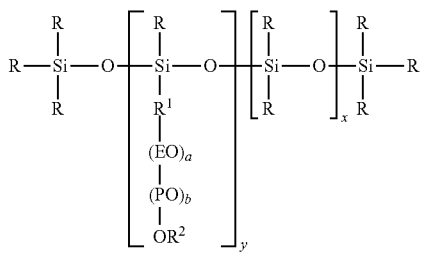

(1)

wherein each R is the same or different and represents a C1-C40 monovalent hydrocarbon group, or a C1-C40 monovalent hydrocarbon group containing hetero atoms, $R^1$ represents a divalent hydrocarbon group having 1-40 carbon atoms,
$R^2$ represents $CH_2CH_3$, $COH(CH_3)_2$, $COCH_3$, $CH_3$ or H,
EO represents $CH_2CH_2O$, PO represents $CH_2(CH_3)CH_2O$,
a is an integer from 0-12, b is an integer selected from 0-3, a+b≥1; x is an integer between 0-3, y is an integer between 1-3, x+y≥1.

2. The composition of claim 1, wherein the silicone in formula 1 is present in an amount of 15-1000 ppm, based on the total weight of the composition.

3. The composition of claim 1, wherein the silicone-containing grinding aid is in the form of an aqueous system.

4. The composition of claim 1, wherein the dosage of silicone of formula 1 in the grinding aid is 0.1-50 wt %, based on the total weight of the silicone containing grinding aid.

5. A method for improving the efficiency of clinker or cement grinding, comprising the steps of: treating clinker or a mineral mixture with the silicone of formula 1 during a ball mill milling process, wherein the amount of limestone in the clinker or in the mineral mixture is greater than or equal to 3 wt %, based on the total weight of the clinker or cement.

6. The method mentioned in claim 5, wherein the silicone of formula 1 is present in an amount from 15-1000 ppm, based on the total weight of cement.

7. The method of claim 5, wherein the grinding efficiency is increased.

8. The method of claim 5, wherein an increase in grinding efficiency is evidenced by a reduced temperature during grinding as compared to the temperature obtained in the ball mill without the use of the silicone of formula 1.

9. The method of claim 5, wherein the compressive strength of the cement is improved, wherein limestone in the cement is present in an amount greater than or equal to 3 wt %, based on the total weight of the cement.

10. A cementitious composition containing the silicone of formula 1 of claim 1 as a post additive in a cement paste, mortar or concrete preparation, wherein the compressive strength of the cement paste, mortar or concrete is improved,
and wherein the cement paste, mortar or concrete contains cement, and limestone in an amount greater than or equal to 3 wt %, based on the total weight of the cement.

11. The composition of claim 10, wherein the silicone of formula 1 is present in an amount from 15-1000 ppm, based on the total weight of cement.

* * * * *